FREQUENCY DISCRIMINATOR
Filed Nov. 19, 1954
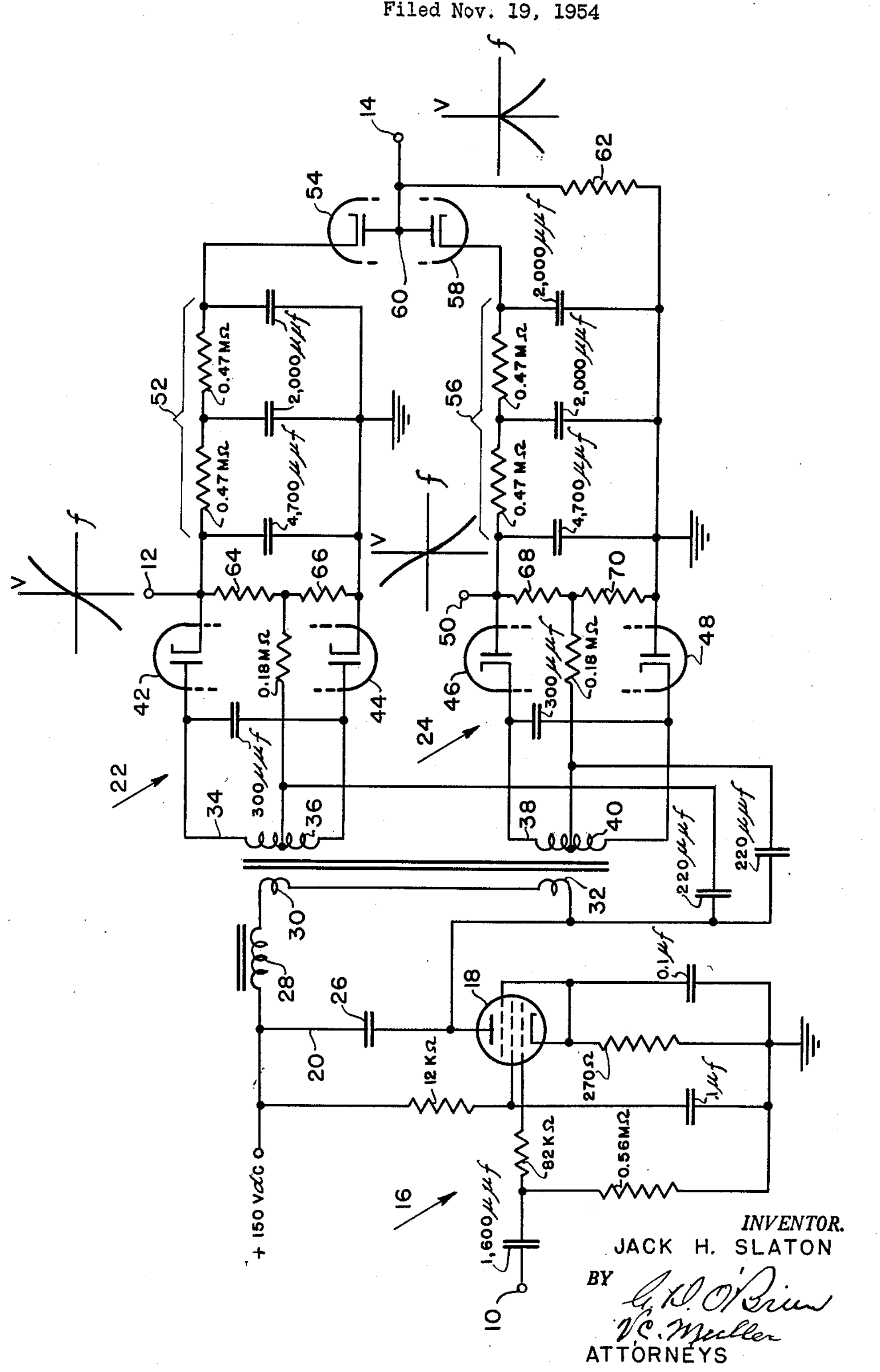
INVENTOR.
JACK H. SLATON
BY G. D. O'Brien
V. C. Mueller
ATTORNEYS

United States Patent Office 3,082,378

Patented Mar. 19, 1963

3,082,378
FREQUENCY DISCRIMINATOR

Jack H. Slaton, Pasadena, Calif., assignor to the United States of America as represented by the Secretary of the Navy Filed Nov. 19, 1954, Ser. No. 470,143
1 Claim. (Cl. 328—132)
(Granted under Title 35, U.S. Code (1952), sec. 266)

The invention described herein may be manufactured and used by or for the Government of the United States of America for governmental purposes without the payment of any royalties thereon or therefor.

This invention relates to frequency discriminators, and in particular to a frequency discriminator suitable for use as a component of an enabler for a pulsed active acoustic guidance system such as is described in U.S. patent application Serial No. 470,142, filed November 19, 1954, for Doppler Enabler, by Jack H. Slaton and Halley Wolfe.

In the above identified Doppler enabler, the discriminator constituting this invention is required to produce two voltages, one voltage being the normal voltage output from a discriminator; i.e., positive for input signals whose frequencies are above the center frequency of the discriminator and negative for input signals whose frequencies are below the center of frequency of the discriminator, and the other voltage being negative for any deviation of the frequency of the input signal from the center frequency of the discriminator.

It is, therefore, an object of this invention to provide an improved discriminator particularly suitable for use as a component of a Doppler enabler.

It is a further object of this invention to provide a frequency discriminator which has a usably large output voltage for small deviations in frequency of the input signal from the center frequency of the discriminator.

It is a still further object of this invention to provide a frequency discriminator which has two channels operating in parallel.

It is another object of this invention to provide a frequency discriminator which has two channels operating in parallel and in which the rectified voltages produced in each channel are added in series with an accompanying increase in sensitivity of the discriminator.

Other objects and many of the attendant advantages of this invention will be readily appreciated as the same become better understood by reference to the following detailed description when considered in connection with the accompanying schematic drawing of the discriminator.

In one application of the invention the center frequency of the discriminator was chosen as 60 kilocycles per second. The discriminator in this instance is also required to produce a large output voltage whenever the frequency of the input signal applied to the discriminator differs from the center frequency of the discriminator by as little as 40 to 60 cycles per second. The output voltage of the discriminator obtained at output terminal 12 is used, in a preferred example, to control the frequency of an oscillator by means of a reactance tube circuit, the voltage at terminal 12 being a substantially linear function of the deviation of the frequency of the input signal from the center frequency of the discriminator; i.e., positive for frequencies above the center frequency of the discriminator and negative for frequencies of the input signal below the center frequency of the discriminator. The output voltage obtained from terminal 14 is negative for both directions of deviation of the frequency of the input signal from the center frequency of the discriminator.

The input signal is applied to input terminal 10. The input signal is amplitude limited by limiter circuit 16 which includes pentode 18. It is, of course, possible to limit the input signal prior to applying it to terminal 10. Limitation of the input signal is necessary in order to lower the limiting threshold of the discriminator so that amplitude modulation of the input signal will not reduce the sensitivity of the discriminator. Limiter circuit 16 also provides a suitable manner for applying the input signal to the common primary parallel resonant circuit 20 of the discriminator which is connected in the plate circuit of tube 18.

The discriminator constituting this invention is a modified "Foster-Seeley" circuit with two channels 22, 24 operating in parallel. The common parallel resonant circuit 20 comprises capacitor 26, inductor 28 and coupling windings 30, 32. Inductor 28 has a separate core from that of coupling windings 30, 32. The inductance of inductor 28 is much larger than the inductance of coupling windings 30, 32. Secondary parallel resonant circuit 34 of channel 22 has secondary winding 36 inductively coupled with the winding 30 of circuit 20, and secondary parallel resonant circuit 38 of channel 24 has secondary winding 40 inductively coupled with winding 32 of circuit 20. Windings 30, 32, 36 and 40 are all wound on a common core. Circuits 34, 38 are sharply tuned to the center frequency of the discriminator, while primary resonant circuit 20 is broadly tuned to the center frequency. Diodes 42, 44 of channel 22 are arranged so that the potential of terminal 12 is positive for frequencies of the input signal above the center frequency of the discriminator and negative for frequencies of the input signal below the center frequency. Diodes 46, 48 are arranged so that terminal 50 of channel 24 is positive for frequencies of the input signal below the center frequency of the discriminator, and negative for frequencies greater than the center frequency of the discriminator. Terminal 12 of channel 22 is connected through low pass filter 52 to the cathode of diode 54. Terminal 50 of channel 24 is connected through low pass filter 56 to the cathode of diode 58. The plates of diodes 55, 58 are connected together at terminal 60. Resistor 62 is connected between terminal 60 and ground. The circuit including diodes 54, 58 and resistor 62 function to suppress the positive portions and pass only the negative portions of the voltages developed at terminals 12, 50. By connecting the cathodes of diodes 54, 58 to terminal 14 and by applying the voltages at terminals 12, 50 to the plates of diodes 54, 58, the output voltage at terminal 14 can be reversed to be the positive portions of the voltages at terminals 12, 50.

Since the voltage at terminal 14 must be zero when the frequency of the input signal coincides with the center frequency of the discriminator, it is necessary for the voltage of terminals 12 and 50 to both be zero under these conditions. This is insured by carefully balancing the voltages obtained from the ends of windings 36, 40. The voltage of terminal 12 is equal to the sum of the voltage across resistors 64, 66 of channel 22, and the voltage of terminal 50 is equal to the sum of the voltage across resistors 68, 70 of channel 24.

In one representative embodiment of the invention components of the following types and values were found to be desirable.

| | |
|---|---|
| Tube 18 | 6AK5. |
| Capacitor 26 | 2,200 $\mu\mu$f. |
| Inductor 28 | 220 turns.[1] |
| Winding 30 | 4 turns.[1] |
| Winding 32 | 4 turns.[1] |
| Winding 36 | 400 turns.[1] |
| Winding 40 | 400 turns.[1] |
| Diodes 42, 44, 46, 48, 54, 58 | ½ 6AL5. |
| Resistor 62 | 3.9 M ohms. |
| Resistors 64, 66, 68, 70 | 0.68 M ohms±1%. |

[1] On a Western Electric core D268269.

The values of components not identified by reference numerals are indicated on the drawing.

Obviously many modifications and variations of the present invention are possible in the light of the above teachings. It is, therefore, to be understood that within the scope of the appended claim the invention may be practiced otherwise than as specifically described.

What is claimed is:

A frequency discriminating system for operating upon an A.C. signal, subject to frequency deviation relative to a predetermined frequency, to provide a combined output signal having amplitude variations dependent upon the extent of input signal frequency deviation but having fixed polarity independent of the sense of input signal frequency deviation relative to said predetermined frequency, said system comprising in combination: separate first and second discriminator circuits for operating upon said input A.C. signal to provide first and second discriminator signals, respectively, each said discriminator signal varying in polarity and amplitude in accordance with the sense and extent, respectively, of said input signal frequency deviation; means for coupling said input signal to each of said discriminator circuits; means comprising a first rectifier and an output load resistor for deriving from said first discriminator signal, and providing across said output load resistor, an output signal which is of fixed polarity, and which varies in amplitude in accordance with input signal frequency deviation of preselected sense relative to said predetermined frequency; and means comprising a second rectifier and said output load resistor for deriving from said second discriminator signal, and providing across said output load resistor, an output signal having the same fixed polarity and varying in amplitude in accordance with input signal frequency deviation of opposite sense.

References Cited in the file of this patent

UNITED STATES PATENTS

| | | |
|---|---|---|
| 2,371,397 | Koch | Mar. 13, 1945 |
| 2,393,400 | Noviks et al. | Jan. 22, 1946 |
| 2,477,963 | Chapin | Aug. 2, 1949 |
| 2,538,040 | Pritchard | Jan. 16, 1951 |
| 2,567,194 | Earp | Sept. 11, 1951 |